United States Patent [19]
Klein et al.

[11] Patent Number: 5,857,625
[45] Date of Patent: Jan. 12, 1999

[54] PAINT GUN INCORPORATING A LASER DEVICE

[75] Inventors: Richard J. Klein; Douglas L. Sevey, both of Waterloo; Alireza Badakhshan; Ricky Jay Bauer, both of Cedear Falls, all of Iowa

[73] Assignee: The University of Northern Iowa Foundation, Cedar Falls, Iowa

[21] Appl. No.: 777,473

[22] Filed: Dec. 30, 1996

[51] Int. Cl.⁶ .......................................................... G01C 3/00
[52] U.S. Cl. ............................................ 239/289; 239/526
[58] Field of Search ................................. 239/289, 690.1, 239/525, 526

[56] References Cited

U.S. PATENT DOCUMENTS

| | | |
|---|---|---|
| Re. 34,749 | 10/1994 | Leong et al. . |
| 1,349,336 | 8/1920 | Haddock . |
| 2,316,751 | 4/1943 | Adler, Jr. . |
| 2,376,836 | 5/1945 | Tunnicliffe . |
| 2,532,104 | 11/1950 | King . |
| 2,629,516 | 2/1953 | Badham . |
| 3,117,480 | 1/1964 | Peddinghaus . |
| 3,731,743 | 5/1973 | Marshall . |
| 4,291,839 | 9/1981 | Brett . |
| 4,427,880 | 1/1984 | Kanade et al. . |
| 4,444,495 | 4/1984 | Bramwell et al. . |
| 4,556,815 | 12/1985 | Ohhashi et al. . |
| 4,614,300 | 9/1986 | Falcoff . |
| 4,702,931 | 10/1987 | Falcoff . |
| 4,836,671 | 6/1989 | Bautista . |
| 4,922,852 | 5/1990 | Price . |
| 4,972,798 | 11/1990 | Ando et al. . |
| 4,982,897 | 1/1991 | Matusita et al. . |
| 5,152,841 | 10/1992 | Medler et al. . |
| 5,160,086 | 11/1992 | Kuykendal et al. . |
| 5,327,218 | 7/1994 | Igaki . |
| 5,355,083 | 10/1994 | George et al. . |
| 5,369,486 | 11/1994 | Matsumoto et al. . |
| 5,564,830 | 10/1996 | Böbel et al. . |
| 5,598,972 | 2/1997 | Klein, II et al. . |

FOREIGN PATENT DOCUMENTS

| | | |
|---|---|---|
| 0007207 | 1/1980 | European Pat. Off. . |
| 3148293 | 2/1984 | Germany . |
| 5-154422 | 6/1993 | Japan . |
| 6-163499 | 6/1994 | Japan . |
| 178330 | 12/1992 | U.S.S.R. . |

OTHER PUBLICATIONS

Laser Displacement Sensors, LB–1000 Series, Keyence Corporation of America, Cat. No. LB3.
Analog Sensor Controller, Model: RV3–55B/RV3–55R, Keyence Corporation of America, Cat. No. RV3, 1992.
Product Guide, Keyence Corporation of America, Cat. No. PG–93.

*Primary Examiner*—Kevin Weldon
*Attorney, Agent, or Firm*—Andrus, Sceales, Starke & Sawall

[57] ABSTRACT

A spray gun for applying a liquid spray coating, such as paint, to a surface incorporates a light source system for gauging the position of the spray gun relative to a worksurface in order to optimize application of the coating to the surface. The light source is preferably in the form of a laser which emits a pair of light beams toward the worksurface. The pair of light beams converge toward each other in a direction toward the surface, and the position of the beams on the surface is used by the operator to judge the distance of the spray gun from the surface. An adjustment mechanism is interconnected with one of the light beam sources, so as to adjust the point of convergence of the light beams. A closable door is associated with the spray gun housing at one of the light beam emitting locations, to selectively prevent emission of one of the light beams from the spray gun, such that a single light beam is emitted from the spray gun for use as a reference for spot application of the coating to the surface.

18 Claims, 1 Drawing Sheet

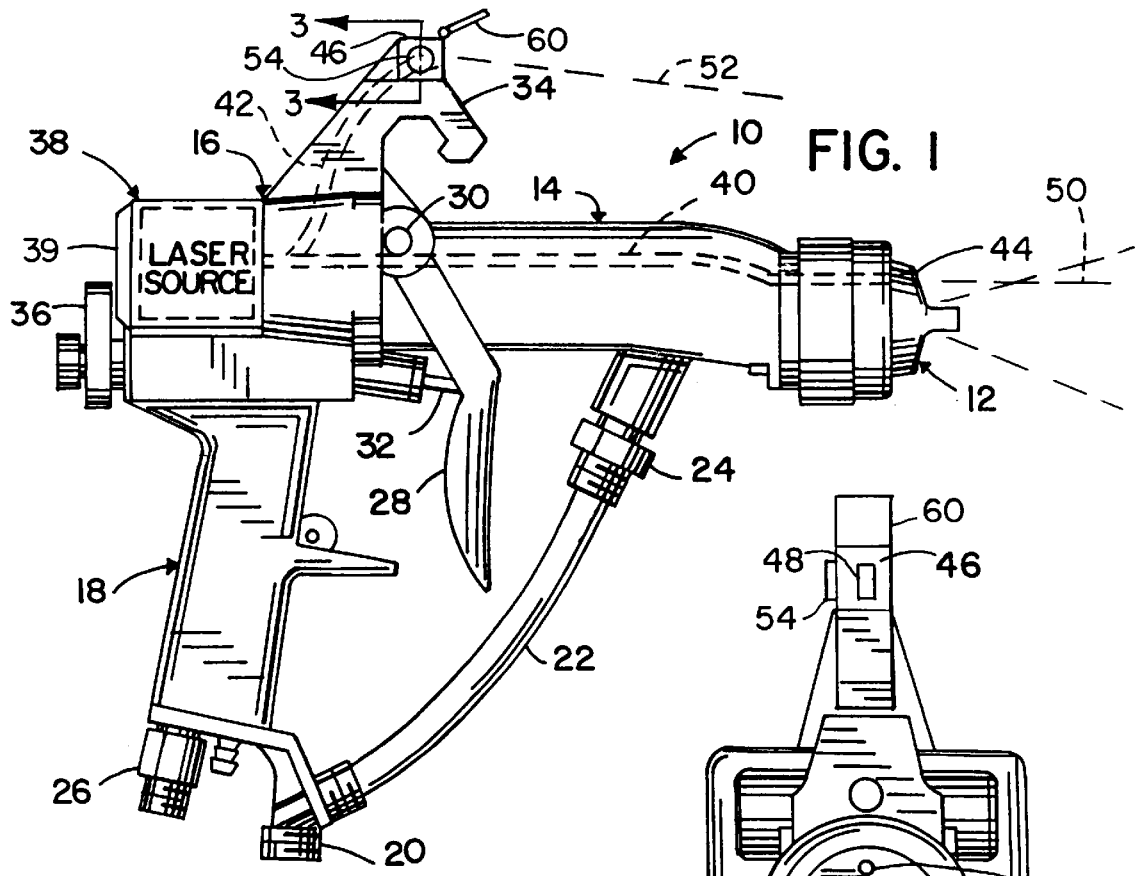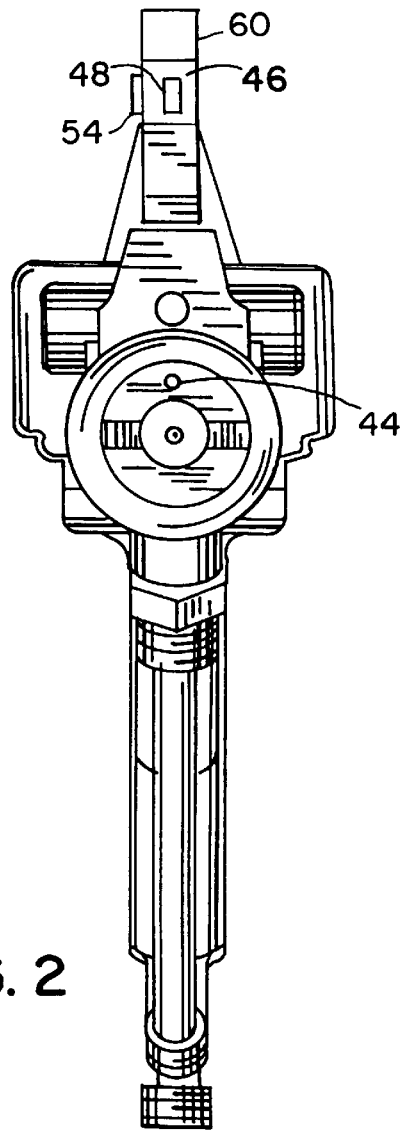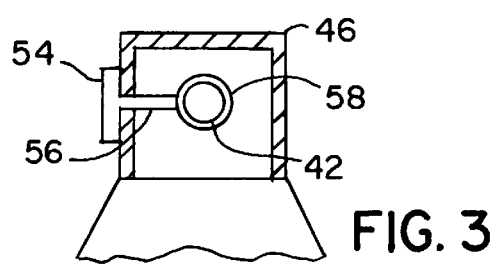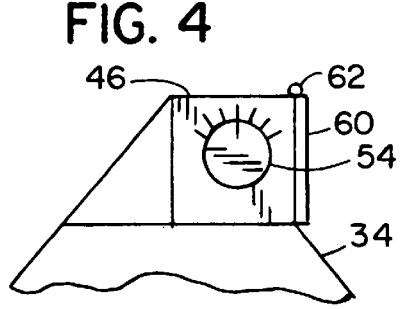

PAINT GUN INCORPORATING A LASER DEVICE

BACKGROUND AND SUMMARY OF THE INVENTION

This invention relates to spray painting systems, and more particularly to a spray painting optimization system that can reduce paint waste and improve operator efficiency in application of paint or other coating to a surface.

Spray paint guns spray paint from a nozzle with compressed air onto a surface being painted. In order to optimize the quality of the finish of the painted surface, it is important to maintain the spray gun at an optimal position relative to the surface. Most importantly, the distance of the nozzle from the surface and the angle of the spray gun relative to the surface must be carefully controlled in order to apply the paint to the surface in a manner which minimizes paint waste and maximizes efficiency in applying the paint to the surface while maintaining the appropriate thickness of paint applied.

Co-pending application Ser. No. 08/504,370 filed Jul. 19, 1995 (now U.S. Pat. No. 5,598,972 issued Feb. 9, 1997, assigned to the same assignee as the present application, discloses an optical spray paint optimization system in which a laser device is mounted alongside a spray gun. The laser device emits a split beam which converges toward the surface. The operator positions the spray gun such that the light beams converge into a single point of light on the surface, for providing a visual indication as to whether the nozzle is a predetermined distance from the surface. The point of convergence of the light beams can be adjusted to provide the optimal distance of the nozzle from the surface to accommodate for varying operator conditions and paint characteristics.

Co-pending application Ser. No. 08/658,935 filed May 30, 1996, also owned by the same assignee as the present application, discloses an optical feedback system utilizing a laser device mounted alongside a spray gun in which light from the laser is reflected from the surface and received by one or more optical sensors or input devices interconnected with a processor. The optical input devices provide input signals to the processor which are used to provide a real-time indication to the operator as to the position of the nozzle, so as to enable the operator to place the nozzle and apply the paint in a manner which minimizes waste and maximizes efficiency in applying the paint to the surface. The optical input devices can also supply raw data to a processor or computer after the painting operation, to analyze overall efficiency and compliance with standards or other operating parameters.

The disclosures of the above-referenced applications are hereby incorporated by reference.

As set forth above, a light beam, such as a beam emitted by a laser, can be effectively used in combination with a paint spray system in order to optimize application of the paint to the surface. Past efforts have involved mounting a laser device to the spray gun in somewhat of a retrofit manner, typically at a location adjacent the nozzle portion of the spray gun. This mounting of the laser device moves the overall center of gravity of the assembly when compared to that of a spray gun without a laser device, and to which an operator is accustomed. The operator must compensate by adjusting his grip on the gun and the motions used to move the gun when applying the paint to the surface.

It is an object of the present invention to incorporate a light-emitting device, such as a laser device, into a spray gun without any significant effect on the overall center of gravity of the spray gun. It is a further object of the invention to incorporate a laser-type light emitting device into the housing of the spray gun without significantly altering the overall configuration of the spray gun. Still another object of the invention is to incorporate a laser-type light emitting device into a spray gun and to emit a pair of convergent light beams from the spray gun toward the surface to provide a reference in positioning the spray gun relative to the surface.

In accordance with the invention, a hand-held spray gun for applying a coating to a surface includes a housing having a handle and defining an interior. A nozzle is mounted to the housing for discharging the liquid coating from the spray gun. A light generating device is disposed within the interior of the housing and includes a light-emitting source for communicating a light beam from the light generating device exteriorly of the housing. The housing defines a forward end and a rearward end. The handle is located toward the rearward end of the housing, and the nozzle is located toward the forward end of the housing. The light generating device is preferably located toward the rearward end of the housing, and the light-emitting source is preferably located toward the forward end of the housing. The light generating device preferably includes a pair of light-emitting sources for emitting a pair of light beams toward the surface. A first one of the light-emitting sources is preferably located toward the forward end of the housing, and a second one of the light-emitting sources is preferably located rearwardly of the first light-emitting source. In a preferred form, the first light-emitting source is located so as to emit a light beam from a location immediately adjacent the nozzle. The pair of light-emitting sources are arranged so as to emit a pair of light beams which converge in a direction toward the surface from the spray gun, to enable a user to ascertain the position of the spray gun relative to the surface by observing the distance between the two light beams. An adjustment mechanism is associated with one of the light-emitting sources for adjusting the angle at which the light beams converge, to enable a user to calibrate the distance of the spray gun from the surface when the light beams are coincident on the surface. The invention further contemplates a shut-off mechanism for selectively preventing emission of one of the light beams, such that the other light-emitting source emits a single light beam toward the surface from the light generating device. This enables a user to provide a reference on the surface when it is desired to spot-apply the coating on the surface. In one embodiment, the shut-off mechanism is in the form of a closable door member mounted to the housing and movable between an open position in which the second light-emitting source emits a light beam from the housing, and a closed position in which the door prevents the light beam from the second light-emitting source from being discharged from the housing. One of the light-emitting sources is located immediately adjacent the nozzle, and the shut-off mechanism is associated with the other of the light-emitting sources such that the single light beam emitting from the spray gun emanates from a location adjacent the nozzle.

The invention also contemplates an improvement in a spray gun including a housing, substantially as set forth in the foregoing paragraph.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side elevation view of a paint spray gun incorporating a light emitting device in accordance with the present invention;

FIG. 2 is a front elevation view of the paint spray gun of FIG. 1;

FIG. 3 is a partial section view taken on line 3—3 of FIG. 1; and

FIG. 4 is a partial side elevation view showing the door member in a closed position for preventing emission of one of the light beams.

DETAILED DESCRIPTION OF THE INVENTION

FIG. 1 illustrates a spray gun 10 constructed according to the invention. Spray gun 10 uses compressed air to spray a coating, such as paint, from a nozzle 12 onto a surface or object being coated (not shown). Generally, spray gun 10 includes a housing defining a spray head section 14 extending forwardly from a box-like body section 16. A handle 18, in the form of a hand grip, extends downwardly from body section 16. Spray head section 14, body section 16 and handle 18 define an interior to the housing of spray gun 10.

In a manner as is known, a paint supply fitting 20 is mounted to the lower end of handle 18 via a bracket, for supplying paint from a paint supply (not shown) to spray head section 14 through a tube 22 and a fitting 24. A compressed air inlet fitting 26 is also interconnected with the lower end of handle 18 via a bracket, for supplying compressed air to body section 16. A trigger 28 is pivotably mounted to body section 16 via a pin 30, and is operable to control the position of a valve plunger 32 for selectively discharging pressurized air from body section 16 into spray head section 14 for mixing with paint from supply tube 22, with the mixture then being discharged through nozzle 12 onto a surface to be coated.

Body section 16 includes an upstanding hook 34, which enables spray gun 10 to be hung for storage when not in use. Control levers, such as shown at 36, are mounted to the rearward end of body section 16 for turning spray gun 10 on and off and for controlling the flow of pressurized air through body section 16 when trigger 28 is depressed.

In accordance with the present invention, a light generating source 38 is incorporated into housing body section 16. Light generating source 38 may be any satisfactory device for generating an intense beam of light, and in a preferred embodiment may be a class II diode laser. A control area 39 is provided at the rearward end of housing body section 16 for providing on/off and intensity control for light generating source 38 and for controlling other operating conditions and functions, as desired.

A pair of fiber optic cables 40, 42 are interconnected with and extend forwardly from light generating source 38 within the interior of housing body section 16. Cable 40 extends forwardly from housing body section 16 through spray head section 14, and terminates at the forward end of spray head section 14. An opening 44 (FIG. 2) is formed in nozzle 12 so as to enable the beam of light emitted by the end of fiber optic cable 40 to pass through nozzle 12 and forwardly toward the surface being painted. Similarly, fiber optic cable 42 extends upwardly from housing body section 16 through a passage formed in upstanding hook 34. A box 46 is provided at the upper end of hook 34, and fiber optic cable 42 extends into box 46. An opening in the form of a slot 48 is formed in the forward end of box 46 so as to enable the beam of light emitted by fiber optic cable 42 to be emitted from box 46 forwardly toward the surface being painted.

In a known manner, laser source 38 generates a single beam of light which is split in accordance with conventional technology, and the split beams are emitted from laser source 38 to fiber optic cables 40, 42.

As shown in FIG. 1, fiber optic cable 40 and opening 44 are arranged such that the beam of light emitted by fiber optic cable 40, shown at 50, is emitted from spray gun 10 in a direction parallel to the direction in which the coating is discharged from nozzle 12 toward the surface. In the illustrated embodiment, the direction of discharge of light beam 50 relative to spray gun 10 is fixed.

Referring to FIGS. 1 and 3, fiber optic cable 42 and slot 48 are constructed and arranged such that the beam of light, shown at 52, emitted by fiber optic cable 42 is oriented at an angle relative to light beam 50, such that light beams 50, 52 converge toward the surface being painted. Light beams 50, 52 each form a spot of light on the surface, and the operator utilizes the distance between the light spots to judge the distance of spray gun 10 and its nozzle 12 relative to the surface. As set forth in co-pending application Ser. No. 08/504,370, the angle between light beams 50 and 52 is such that when the spots of light on the surface from beams 50, 52 converge into a single spot, the distance of nozzle 12 relative to the surface is optimal for applying paint to the surface with minimal waste.

Referring to FIG. 3, an adjustment knob 54 is rotatably mounted to one side wall of box 46, and a shaft 56 extends from knob 54 into the interior of box 46. A collar 58 is mounted to the end of shaft 56, and fiber optic cable 42 extends through collar 58. The operator can rotate knob 54 to turn shaft 56 and collar 58, which in turn functions to adjust the angle at which light beam 52 is emitted from box 46. Slot 48 is constructed so as to enable emission of light beam 52 throughout its range of angular positions relative to box 46. Calibrations are provided on the exterior side wall of box 46 to which knob 54 is mounted, so as to enable a user to gauge the adjustment of the angle of light beam 52 relative to spray gun 10. In this manner, the user can adjust the angle of discharge of light beam 52 according to operating conditions and paint characteristics, so that the distance of spray gun 10 from the surface at which light beams 50, 52 converge on the surface can be adjusted according to such conditions.

As shown in FIGS. 1 and 4, a movable door 60 is mounted to the upper wall of box 46 via a hinge structure 62. Door 60 is movable between an open position as shown in FIG. 1 and a closed position as shown in FIG. 4. In a preferred form, a retainer structure is provided between door 60 and the upper wall of box 46 for maintaining door 60 in its open position, and is also provided between door 60 and the front wall of box 46 for maintaining door 60 in its closed position. When door 60 is in its open position, light beam 52 is emitted from slot 48, as set forth above. When door 60 is in its closed position of FIG. 4, door 60 prevents light beam 52 from being emitted from slot 48, such that only light beam 50 is emitted from spray gun 10 toward the surface. In this manner, light beam 50 functions to provide a reference on the surface for the user, which is useful when spot-applying paint in a desired location on the surface. Since light beam 50 is emitted in a direction parallel to the direction of spray from paint gun 10, the spot on the surface from light beam 50 provides a reliable reference to the user as to the location on the surface at which paint from nozzle 12 will be applied.

It is understood that light generating source 38 could be any source of light and is not limited to a laser-type source.

In addition, the light source and spray gun could be constructed such that light beams 50 and 52 emanate from other locations on spray gun 10 toward the surface, and are not limited to the illustrated locations. For example, additional protrusions could be formed in other locations on spray gun 10 for receiving the end of a fiber optic cable and discharging a light beam therefrom toward the surface.

It can thus be appreciated that the invention incorporates a light source system into a spray gun without affecting the general overall configuration of the spray gun and without affecting the center of gravity of the spray gun. The spray gun can thus be used by an operator without modifying existing techniques, and enables the operator to increase his or her efficiency in application of paint by accurately judging the distance of the spray gun relative to the surface.

Various alternatives and embodiments are contemplated as being within the scope of the following claims particularly pointing out and distinctly claiming the subject matter regarded as the invention.

We claim:

1. A hand-held spray gun for applying a coating to a surface comprising:

a housing including a handle and defining an interior;

a nozzle mounted to the housing for discharging the coating therefrom; and a light generating device disposed within the interior of the housing and including a light-emitting arrangement for communicating a light beam from the light generating device exteriorly of the housing and toward the surface, wherein the light-emitting arrangement defines a pair of light emission locations spaced apart from each other on the housing and operable to communicate a pair of non-parallel light beams exteriorly of the housing and toward the surface.

2. The spray gun of claim 1, wherein the housing defines a forward end and a rearward end, wherein the handle is located toward the rearward end and the nozzle is located toward the forward end.

3. The spray gun of claim 2, wherein the light generating device is located toward the housing rearward end and the light emission locations are located toward the housing forward end.

4. The spray gun of claim 3, wherein one of the light emission locations is adjacent the nozzle.

5. The spray gun of claim 3, wherein the housing defines a box-like portion adjacent its rearward end, wherein the light generating device is disposed within the box-like portion and wherein the handle is interconnected with and extends downwardly from the box-like portion.

6. The spray gun of claim 1, wherein a first one of the light emission locations is disposed toward the housing forward end and wherein a second one of the light emission locations is disposed rearwardly of the housing forward end.

7. The spray gun of claim 6, wherein the first one of the light emission locations is operable to emit a light beam from a location immediately adjacent the nozzle.

8. The spray gun of claim 1, wherein the light emission locations are operable to emit a pair of light beams which converge toward each other in a direction toward the surface from the spray gun.

9. The spray gun of claim 8, further comprising an adjustment mechanism associated with one of the light emission locations for adjusting the angle at which the light beams converge.

10. The spray gun of claim 1, further comprising a shut-off mechanism for selectively preventing emission of one of the light beams such that a single light beam is emitted toward the surface from the light generating device.

11. The spray gun of claim 10, wherein the single light beam is emitted in a direction substantially parallel to the direction in which the coating is discharged from the nozzle to provide a reference for spraying the coating onto the surface.

12. The spray gun of claim 11, wherein the light emission location from which the single light beam is emitted is disposed immediately adjacent the nozzle.

13. The spray gun of claim 10, wherein the pair of light emission locations are operable to emit a pair of light beams which converge toward the surface from the spray gun, and further comprising an adjustment mechanism associated with one of the light emission locations for adjusting the angle at which the light beams converge.

14. In a spray gun including a housing defining an interior a forward end, a rearward end and a nozzle mounted to the housing forward end for applying a liquid coating to a surface, the improvement comprising a light generating device disposed within the housing and located rearwardly of the housing forward end, and an elongated light-emitting member extending therefrom to a light emission location on the housing for communicating a light beam from the light generating device exteriorly of the housing toward the surface.

15. The improvement of claim 14, wherein the light generating device includes a pair of light-emitting members for communicating a pair of light beams from the light generating device exteriorly of the housing toward the surface.

16. The improvement of claim 15, wherein the pair of light-emitting members are constructed and arranged such that the pair of light beams converge toward the surface from the spray gun.

17. The improvement of claim 15, further comprising a shut-off mechanism for selectively preventing emission of one of the light beams such that the light generating device functions to emit a single light beam toward the surface.

18. A hand-held spray gun for applying a coating to a surface, comprising:

a housing defining a forward end and a rearward end and an interior, wherein the housing includes a handle located toward its rearward end;

a nozzle mounted to the housing toward its forward end for discharging the coating therefrom; and a light generating device disposed within the interior of the housing toward the rearward end of the housing, wherein the light generating device includes a pair of light-transmissive members extending forwardly therefrom within the interior of the housing, wherein the housing includes a pair of openings and wherein each light-transmissive member terminates at an end located adjacent one of the openings so as to enable light from each light-transmissive member to communicate from the interior of the housing to the exterior of the housing toward the surface.

* * * * *

UNITED STATES PATENT AND TRADEMARK OFFICE
CERTIFICATE OF CORRECTION

PATENT NO. : 5,857,625
DATED : January 12, 1999
INVENTOR(S) : RICHARD J. KLEIN, II ET AL It is certified that error appears in the above-indentified patent and that said Letters Patent is hereby corrected as shown below:

On The Title Page,

[75] Inventors: Add -- II to the last name of the first inventor, so that it appears as Richard J. Klein, II

[56] References: Add the following references -- 5,351,126, 9/1994, Takada et al; 1,670,426, 5/1928, Weber; 3,784,804, 1/1974, Sabatelli et al; 4,120,016, 10/1978, Hendricks; 4,915,303, 4/1990, Hufgard; 4,995,560, 2/1991, Lasley et al; 5,069,389, 12/1991, Bitsakos; 5,582,350, 12/1996, Kasmyna et al --

In The Claims

Claim 1, column 5, line 22, after "surface" insert -- , --.

Signed and Sealed this

Twenty-fifth Day of May, 1999

Attest:

Attesting Officer

Q. TODD DICKINSON

Acting Commissioner of Patents and Trademarks